United States Patent
Takahashi

(10) Patent No.: US 9,621,786 B2
(45) Date of Patent: Apr. 11, 2017

(54) IMAGE PROCESSING APPARATUS, IMAGE PROCESSING METHOD, IMAGE PROCESSING PROGRAM, AND IMAGE PICKUP APPARATUS ACQUIRING A FOCUSING DISTANCE FROM A PLURALITY OF IMAGES

(71) Applicant: CANON KABUSHIKI KAISHA, Tokyo (JP)

(72) Inventor: Takahiro Takahashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/620,408

(22) Filed: Feb. 12, 2015

(65) Prior Publication Data
US 2015/0156404 A1 Jun. 4, 2015

Related U.S. Application Data

(63) Continuation of application No. 13/862,880, filed on Apr. 15, 2013, now Pat. No. 8,988,592.

(30) Foreign Application Priority Data

May 17, 2012 (JP) .................................. 2012-113472

(51) Int. Cl.
*H04N 5/232* (2006.01)
*G06T 5/00* (2006.01)

(52) U.S. Cl.
CPC ......... *H04N 5/23212* (2013.01); *G06T 5/003* (2013.01)

(58) Field of Classification Search
CPC .. H04N 5/23212; H04N 5/23248; G02B 7/28; G02B 7/36; G03B 13/36; G06T 5/003; G06T 5/004
(Continued)

(56) References Cited

U.S. PATENT DOCUMENTS 5,193,124 A 3/1993 Subbarao
5,581,377 A 12/1996 Shimizu et al.
(Continued)

FOREIGN PATENT DOCUMENTS

JP 63-135909 6/1988
JP 07-021365 A 1/1995
(Continued)

OTHER PUBLICATIONS

Ikehata et al,; "Confidence-Based refinement of corrupted depth maps"; Dec. 2012; 20122 Asia-Pacific Signal and Information Processing Association Annual Summit and Conference (APSIPA ASC) pp. 1-6.
(Continued)

*Primary Examiner* — John Villecco
(74) *Attorney, Agent, or Firm* — Fitzpatrick, Cella, Harper & Scinto

(57) ABSTRACT

An image processing apparatus that acquires a focusing distance from a plurality of images each having different degrees of blur, includes: a misalignment detection unit that detects misalignment among the plurality of images; a distance information acquisition unit that acquires, based on the plurality of images, distance information, which is information to indicate a focusing distance in an area of the images; and a reliability information acquisition unit that creates, based on the detected misalignment, reliability information, which is information to indicate reliability of the focusing distance acquired for each area, wherein the distance information acquisition unit changes the acquired distance information based on the reliability information.

16 Claims, 11 Drawing Sheets

RELIABILITY MAP 1

RELIABILITY MAP 2

(58) Field of Classification Search
USPC .......................................... 382/106, 107, 255
See application file for complete search history.

(56) References Cited

U.S. PATENT DOCUMENTS

| | | | |
|---|---|---|---|
| 5,581,668 A | 12/1996 | Oida et al. | |
| 5,777,750 A | 7/1998 | Takiyama et al. | |
| 8,145,049 B2 | 3/2012 | Hirai et al. | |
| 8,269,879 B2 | 9/2012 | Sugimoto | |
| 8,421,905 B2 | 4/2013 | Sugimoto | |
| 8,432,434 B2 | 4/2013 | Veeraraghavan et al. | |
| 8,644,697 B1 | 2/2014 | Tzur et al. | |
| 8,750,699 B2 | 6/2014 | Kawarada | |
| 8,885,890 B2* | 11/2014 | Tardif | G06T 5/002 382/106 |
| 8,983,121 B2* | 3/2015 | Lim | G06K 9/00771 382/103 |
| 9,201,288 B2* | 12/2015 | Oikawa | G03B 13/36 |
| 2009/0135291 A1 | 5/2009 | Sugimoto | |
| 2010/0208140 A1 | 8/2010 | Fukunishi | |
| 2012/0121163 A1 | 5/2012 | Zhang et al. | |
| 2012/0163701 A1 | 6/2012 | Gomi | |
| 2012/0218461 A1 | 8/2012 | Sugimoto | |
| 2012/0274634 A1 | 11/2012 | Yamada et al. | |
| 2013/0093159 A1 | 4/2013 | McAndrews et al. | |
| 2013/0101177 A1 | 4/2013 | Yamada et al. | |
| 2013/0136339 A1 | 5/2013 | Moon et al. | |
| 2013/0142415 A1 | 6/2013 | Ali et al. | |
| 2013/0155050 A1 | 6/2013 | Rastogi et al. | |
| 2013/0188019 A1 | 7/2013 | Christopher et al. | |
| 2013/0208979 A1 | 8/2013 | Steinberg et al. | |
| 2013/0215107 A1 | 8/2013 | Kimura et al. | |
| 2013/0307966 A1 | 11/2013 | Komatsu | |
| 2014/0049612 A1 | 2/2014 | Ishii | |
| 2014/0118494 A1 | 5/2014 | Wu et al. | |
| 2014/0152886 A1 | 6/2014 | Morgan-Mar et al. | |
| 2014/0267243 A1 | 9/2014 | Venkataraman et al. | |
| 2014/0307126 A1* | 10/2014 | Son | H04N 5/23212 348/231.6 |
| 2015/0042840 A1* | 2/2015 | Komatsu | H04N 5/23229 348/222.1 |
| 2015/0043783 A1* | 2/2015 | Ishihara | G06T 7/0069 382/106 |
| 2015/0043808 A1* | 2/2015 | Takahashi | H04N 13/0022 382/154 |
| 2015/0124158 A1* | 5/2015 | Ishii | H04N 5/23212 348/354 |
| 2015/0138430 A1* | 5/2015 | Ogura | H04N 5/2328 348/349 |
| 2015/0201182 A1* | 7/2015 | Chang | H04N 13/0271 348/47 |
| 2015/0358530 A1* | 12/2015 | Nakamura | H04N 5/23293 348/349 |
| 2015/0371090 A1* | 12/2015 | Miyasako | G06K 9/00744 386/241 |
| 2016/0048952 A1* | 2/2016 | Tezaur | G06T 5/004 382/255 |
| 2016/0212323 A1* | 7/2016 | Ishii | H04N 5/23212 |
| 2016/0248967 A1* | 8/2016 | Sasaki | H04N 5/23212 |

FOREIGN PATENT DOCUMENTS

| | | |
|---|---|---|
| JP | 09-181966 A | 7/1997 |
| JP | 3305314 B2 | 7/2002 |
| JP | 2007-286474 A | 11/2007 |
| JP | 2009-133903 A | 6/2009 |
| JP | 2010-039946 A | 2/2010 |
| JP | 2013172190 A | 9/2013 |
| WO | 2012140869 A1 | 10/2012 |

OTHER PUBLICATIONS

Lee et al,; "Depth map enhancement based on Z-displacement of objects"; May 2013; 2013 IEEE International Symposium on Circuits and Systems (ISCAS); pp. 2361-2364.

Zheng et al,; "Robust depth-map estimation from image sequences with precise camera operation parameters"; Sep. 2000; 2000 International Conference on Image Processing; pp. 764-767; vol. 2.

JP Office Action dated Mar. 15, 2016, issued in Japanese Patent Application No. 2012-113472.

* cited by examiner

RELIABILITY MAP 3

INTEGRATED
RELIABILITY MAP

IMAGE PROCESSING APPARATUS, IMAGE PROCESSING METHOD, IMAGE PROCESSING PROGRAM, AND IMAGE PICKUP APPARATUS ACQUIRING A FOCUSING DISTANCE FROM A PLURALITY OF IMAGES

CROSS-REFERENCE TO RELATED APPLICATION

This application is a Continuation of U.S. application Ser. No. 13/862,880, filed Apr. 15, 2013, and allowed on Nov. 12, 2014, and which claims priority from Japanese Patent Application No. 2012-113472 filed May 17, 2012, which are both incorporated herein in their entireties by reference.

BACKGROUND OF THE INVENTION

Field of the Invention

The present invention relates to an image processing technique for estimating a focusing distance using a plurality of photographed images.

Description of the Related Art

A technique for generating an image whose whose depth of field is shallow from an image whose depth of field is deep using image processing is known (e.g. Japanese Patent Application Laid-Open No. H7-021365, Japanese Patent Application Laid-Open No. H9-181966). To generate an image whose depth of field is shallow, a depth map representing a distance distribution of an object is created, a main object and a background are separated from each other based on the created depth map, and only the background image is blurred.

A generally used method for creating a depth map involves analyzing a plurality of photographed images. Concrete examples are the depth from defocus (DFD) method, which estimates a distance based on a difference of a degree of blur of a plurality of images photographed with different focusing positions, and a stereo method, which estimates a distance from the correspondence of pixels among the images based on the principle of triangulation. These methods are called "passive methods", whereas active methods acquire a distance by irradiating an object with ultrasound, infrared, or the like when capturing an image, and are widely used since no special apparatus is required.

However these passive methods are used for analyzing photographed images, hence depending on a photographed scene, accurately estimating a distance of an object may be difficult. In the case of the DFD method, there is no need to search the correspondence among pixels, unlike the stereo method, but an incorrect depth map may be generated if an area where blur hardly appears exists in an image, since the distance is calculated based on the blur in the image. If an image whose depth of field is shallow is generated using an incorrect depth map, a correct blurring effect cannot be acquired in an area where a correct depth map is not determined. In other words, image quality deterioration, which is visually unacceptable, is generated, such as by blurring a main object area which should not be blurred, and by not blurring a background area to be blurred.

SUMMARY OF THE INVENTION

With the foregoing in view, it is an object of the present invention to provide an image processing apparatus, an image processing method, an image processing program and an image pickup apparatus that can decrease image quality deterioration in blurring processing by reducing errors in estimating the focusing distance.

The present invention according to one aspect provides an image processing apparatus that acquires a focusing distance from a plurality of images, each having different degrees of blur, comprising: a misalignment detection unit that detects misalignment among the plurality of images; a distance information acquisition unit that acquires, based on the plurality of images, distance information, which is information to indicate a focusing distance in an area of the images; and a reliability information acquisition unit that creates, based on the detected misalignment, reliability information, which is information to indicate the reliability of the focusing distance acquired for each area, wherein the distance information acquisition unit changes the acquired distance information based on the reliability information.

The present invention according to another aspect provides an image processing method used by an image processing apparatus that acquires a focusing distance from a plurality of images each having different degrees of blur, the method comprising the steps of: detecting misalignment among the plurality of images; acquiring, based on the plurality of images, distance information, which is information to indicate a focusing distance in an area of the images; creating, based on the detected misalignment, reliability information, which is information to indicate the reliability of the focusing distance acquired for each area; and changing the acquired distance information based on the reliability information.

The present invention according to another aspect provides a non-transitory storage medium recording an image processing program for causing an image processing apparatus, which acquires a focusing distance from a plurality of images each having different degrees of blur, to execute the steps of: detecting misalignment among the plurality of images; acquiring, based on the plurality of images, distance information, which is information to indicate a focusing distance in an area of the images; creating, based on the detected misalignment, reliability information, which is information to indicate the reliability of the focusing distance acquired for each area; and changing the acquired distance information based on the reliability information.

According to the present invention, an image processing apparatus, an image processing method, an image processing program and an image pickup apparatus that can decrease image quality deterioration in blurring processing by reducing errors in estimating the focusing distance can be provided.

Further features of the present invention will become apparent from the following description of exemplary embodiments with reference to the attached drawings.

DESCRIPTION OF THE PREFERRED EMBODIMENTS

Preferred embodiments of the present invention will now be described with reference to the drawings. The scope of the present invention, however, is not limited to the examples described in the embodiments. An image pickup apparatus according to this embodiment has a function to photograph a plurality of images captured with different focusing positions, and a function to generate an image whose depth of field is shallower by processing the plurality of photographed images.

<System Configuration>

Figure 1A:
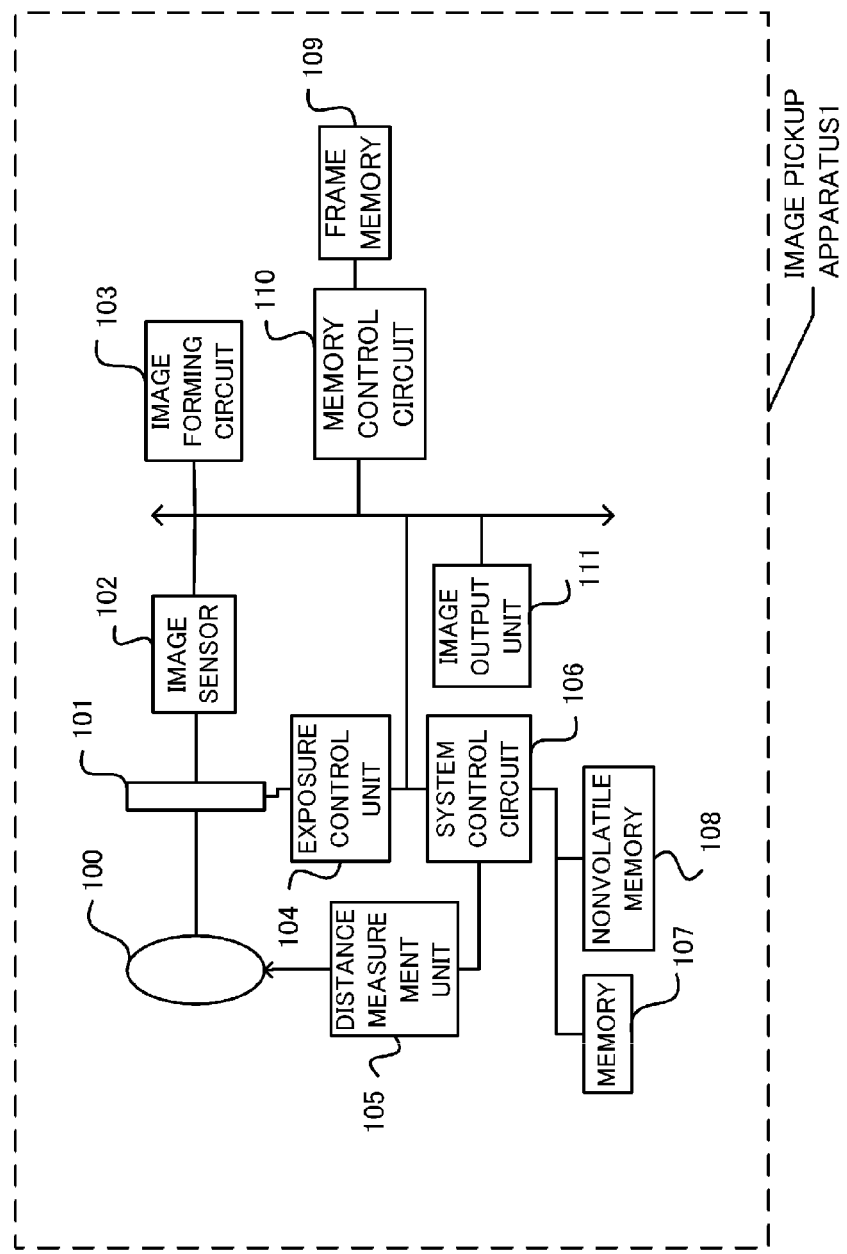
FIG. 1A is a block diagram depicting a configuration of an image pickup apparatus.

FIG. 1A shows a system configuration of an image pickup apparatus according to this embodiment. The image pickup apparatus 1 is a digital still camera, a digital video camera or the like, that includes an image processing apparatus according to the present invention.

The reference numeral 100 denotes a camera lens that guides object light to an image sensor 102. The reference numeral 101 denotes an exposure control element including an aperture and a shutter. The object light that enters through the camera lens 100 enters the image sensor 102 via the exposure control element 101. The image sensor 102 is an image sensor that converts the object light into an electric signal, and outputs the electric signal, and is typically such an image sensor as a CCD and CMOS. The image forming circuit 103 is an image forming circuit for digitizing and imaging an analog signal outputted from the image sensor 102. The image forming circuit 103 is constituted by an analog/digital conversion circuit, an auto gain control circuit, an auto white balance circuit, a pixel interpolation processing circuit, and a color conversion processing circuit, for example, which are not illustrated. The image forming circuit 103 includes a depth of field control circuit for changing the depth of field of a formed image. The depth of field control circuit corresponds to the image processing apparatus of the present invention.

An exposure control unit 104 is a unit that controls the exposure control element 101. A distance measurement control unit 105 is a unit that controls focusing of the camera lens 100. The exposure control unit 104 and the distance measurement control unit 105 are controlled using the through the lens (TTL) method (a method for controlling exposure and focusing by measuring light that actually is transmitted through the camera lens). The system control circuit 106 is a control circuit for controlling the generation operation of the image pickup apparatus 1. The system control circuit 106 performs control of an optical system for photographing, and control for digitally processing photographed images. The memory 107 is a memory using a flash ROM or the like for recording data for operation control and processing programs which are used for the system control circuit 106. A nonvolatile memory 108 is an electrically erasable or recordable nonvolatile memory, such as EEPROM, that stores various adjustment values and other information. A frame memory 109 is a frame memory for storing several frames of an image generated by the image forming circuit 103. A memory control circuit 110 is a memory control circuit for controlling an image signal that is inputted to/outputted from the frame memory 109. An image output unit 111 is an image output unit for displaying an image generated by the image forming circuit 103 to an image output apparatus, which is not illustrated.

Figure 1B:
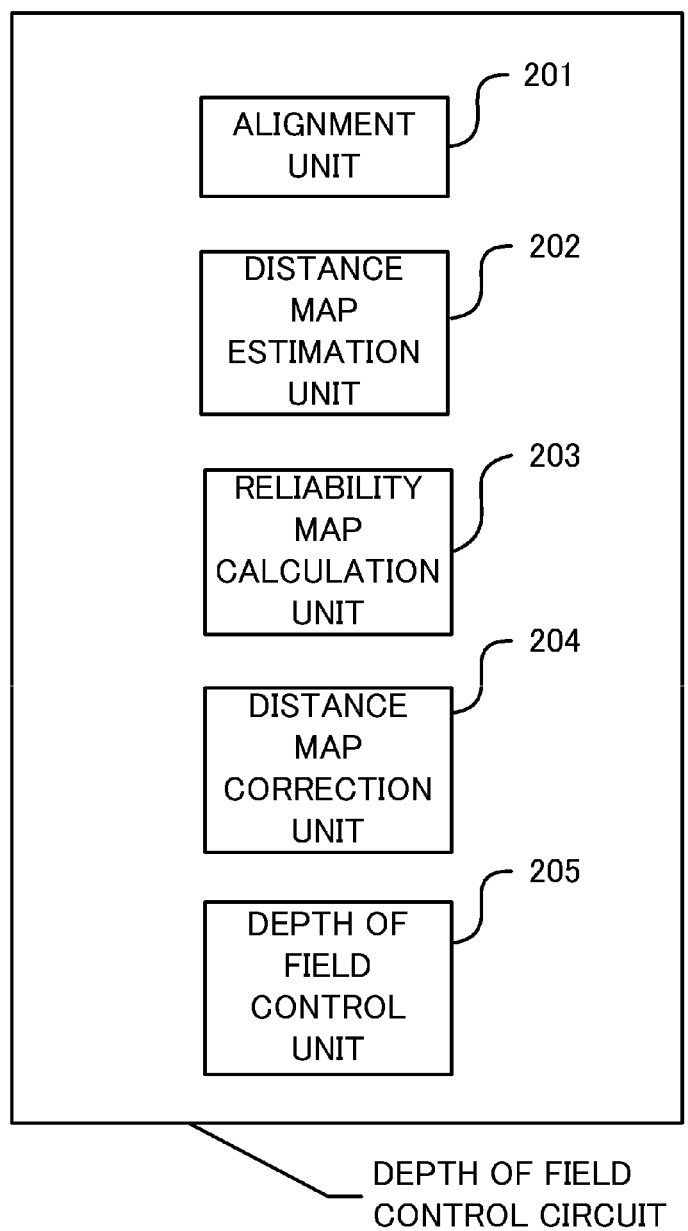
FIG. 1B is a block diagram depicting a configuration of a depth of field control circuit.

Now a configuration of the depth of field control circuit included in the image forming circuit 103 will be described with reference to FIG. 1B.

The image processing apparatus according to the present invention, that is the depth of field control circuit according to this embodiment, may be implemented using a dedicated circuit, or may be implemented by a computer. In the case of using a computer, each unit shown in FIG. 1B functions by programs stored in an auxiliary storage apparatus that is loaded to a main storage apparatus and executed by a CPU (the CPU, the auxiliary storage apparatus and the main storage apparatus are not illustrated).

An alignment unit 201 is a unit that aligns a plurality of photographed images, and includes the misalignment detection unit according to the present invention. In this embodiment, two images, that is a focused image and a defocused image, are used for the processing, since the DFD method is used for estimating distance. These two images are photographed in succession, hence the positions of the object may not match perfectly. The alignment unit 201 acquires a misalignment width and/or a misalignment direction between the images, detects the misalignment, and aligns the positions. In the following positions, a focused image refers to an image where the object is focused, and a defocused image refers to an image where the object is blurred compared with the focused image.

A depth map estimation unit 202 is a unit that estimates a focusing distance for each area by applying the DFD method to the two images, and creates a depth map which represents the distribution of the focusing distance on the image. The DFD method will be described in detail later. The phrase "focusing distance" used in this description indicates a distance to the object. A reliability map calculation unit 203 determines, for each area, a reliability which indicates how reliable the depth map created by the depth map estimation unit 202 is, and creates a reliability map which indicates the distribution of this reliability on the image. The method for calculating the reliability will be described in detail later. The reliability map calculation unit 203 corresponds to the reliability information calculation unit according to the present invention.

A depth map correction unit 204 is a unit that corrects the depth map based on the reliability map created by the reliability map calculation unit 203, and creates a corrected depth map. The method for correcting a depth map will be described later. The depth map estimation unit 202 and the depth map correction unit 204 correspond to the distance information calculation unit according to the present invention.

The depth of field control unit 205 is a unit that blurs a photographed image based on the corrected depth map created by the depth map correction unit 204. The depth of field control unit 205 corresponds to the depth of field control unit according to the present invention.

<Flow Chart>

Figure 2A:
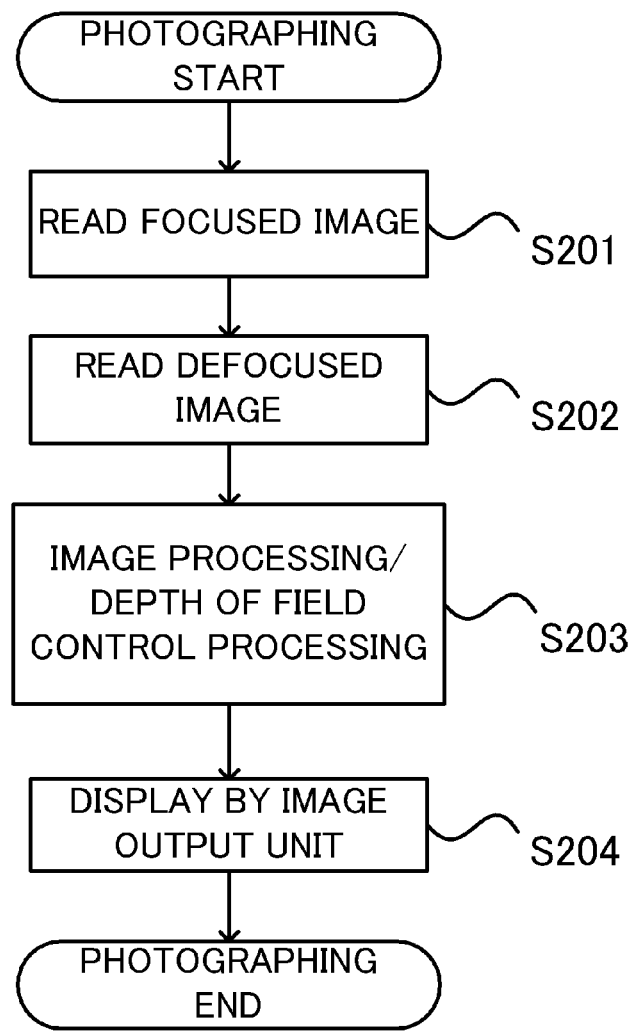
FIG. 2A and FIG. 2B are flow charts depicting an operation of the image pickup apparatus.

Now an operation of the image pickup apparatus 1 will be described in detail with reference to the flow chart. FIG. 2A is a flow chart depicting a processing from the image pickup apparatus 1 photographing an object until blurring the photographed image in a predetermined way, that is until the generating of an image whose depth of field is shallow, and displaying the generated image.

If a photographing start button (not illustrated) is pressed, step S201 starts. In step S201, the exposure control unit 104 and the distance measurement control unit 105 control exposure and focusing, and determine the photographing conditions. Then, the image sensor 102 converts the object image, which was formed via the optical system 100, into an electric signal, and generates an analog signal according to the brightness of the object. Then, the analog signal generated by the image sensor 102 is formed into a digital image by the image forming circuit 103, and is recorded in the frame memory 109. The image acquired in step S201 is a focused image.

In step S202, the object is photographed in the same manner under different photographing conditions including the focusing position, the aperture stop, and the focal distance, so that the degree of blurring of the object is different from the image photographed in step S201. The photographing conditions may be changed in any way only if an image of the same object, whose degree of blurring is different, can be acquired. The photographed image is recorded in the frame memory 109 in the same manner. The image acquired in step S202 is the defocused image. It is preferable to photograph the image in step S201 and the image in step S202 successively in a short time, so that the positions of the object do not deviate.

In step S203, the image forming circuit 103 performs image processing on the image recorded in the frame memory 109. The image processing includes, for example, white balance, pixel interpolation, color conversion and noise reduction.

Further in step S203, the depth of field control circuit included in the image forming circuit 103 performs processing to estimate a depth map on the image recorded in the frame memory 109, and processing to change the depth of field of the image based on the estimated depth map. Hereafter these two processings are called "depth of field control processing". The sequence of executing the depth of field control processing and other image processings can be set so that the acquired image becomes optimum, and is not especially restricted. This is the same for the parameters in the other image processings.

Figure 2B:
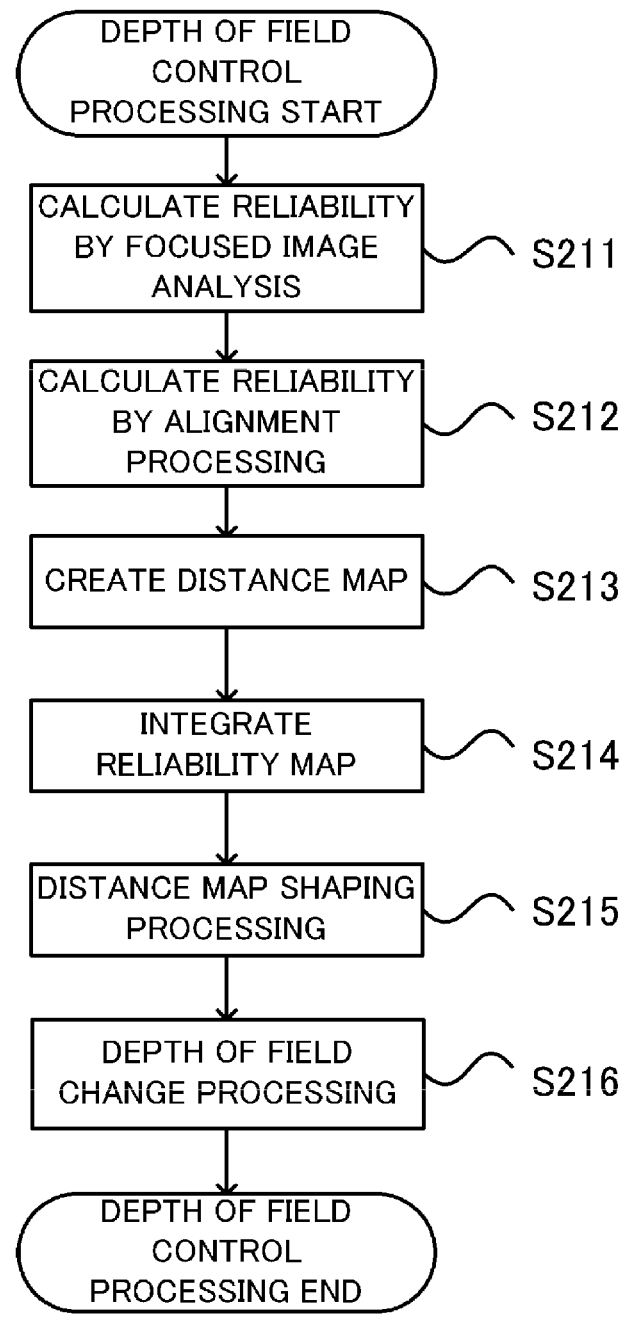

FIG. 2B is a flow chart depicting details of the depth of field control processing performed in step S203.

First in step S211, the reliability map calculation unit 203 analyzes the focused image, and creates a reliability map. The reliability map is a map to indicate the reliability of a depth map created in step S213, and is a map to indicate the accuracy of the distance from the image pickup apparatus to the object estimated by the DFD method. This reliability map may be a map segmented into each pixel of the photographed image, or may be a map segmented into each predetermined small block, such as a rectangular area. There are no restrictions to the size or shape of a segment. In this embodiment, the photographed image is segmented into rectangular areas.

Figure 3A:
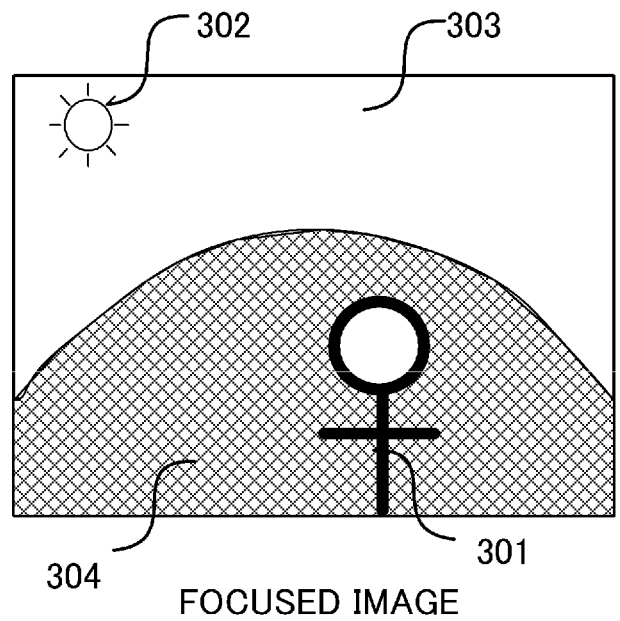
FIG. 3A and FIG. 3B show examples of a focused image and a defocused image.
Figure 3B:
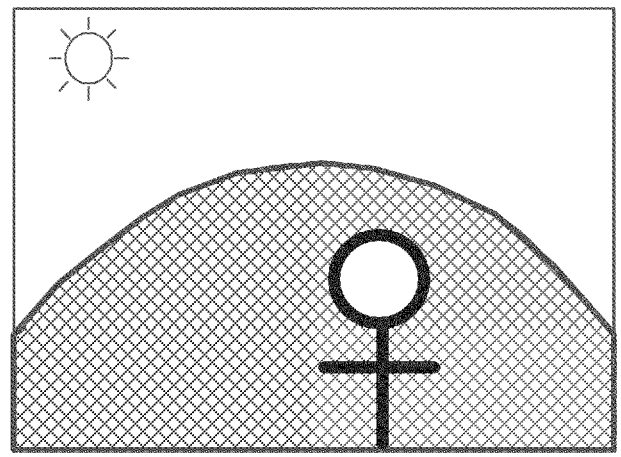

Concrete examples will now be described with reference to FIG. 3A and FIG. 3B. FIG. 3A shows a focused image photographed in step S201, and FIG. 3B shows a defocused image photographed in step S202.

The reliability map is generated based on the focused image in FIG. 3A. In concrete terms, the reliability is determined for each segment rectangular area, and is sequentially assigned to the reliability map. The reliability is a value that indicates how easily an area is influenced by the defocusing. An area which is not easily influenced by defocusing indicates an area which has few keys to calculate the distance by the DFD method, hence an area whose reliability is low refers to an area whose calculated distance is not accurate. In the case of FIG. 3A, for example, a portion whose brightness is high, such as the sun (reference numeral 302) and a portion where brightness does not change, such as the sky (reference numeral 303), are portions where the influence of defocusing cannot be detected so easily, that is, the difference of blurring cannot be detected very well, therefore the distance of these areas cannot be accurately estimated, in other words, these are portions whose reliability is low.

The reliability corresponding to an area, that is how easily the difference of blur can be detected, can be determined based on brightness values, chroma values, and hue of the pixels existing in the area, frequency characteristics of the area and the like. In concrete terms, the following areas can be determined as an area whose reliability is low. Example 1: An average of the brightness values of the pixels in the area is outside a predetermined range. Example 2: The brightness values of the pixels in the area do not change much. Example 3: The spatial frequency in the area is lower than a predetermined value. Thus a plurality of evaluation standards can be used to determine the reliability. Another evaluation standard other than the above examples may be used.

Figure 4A:
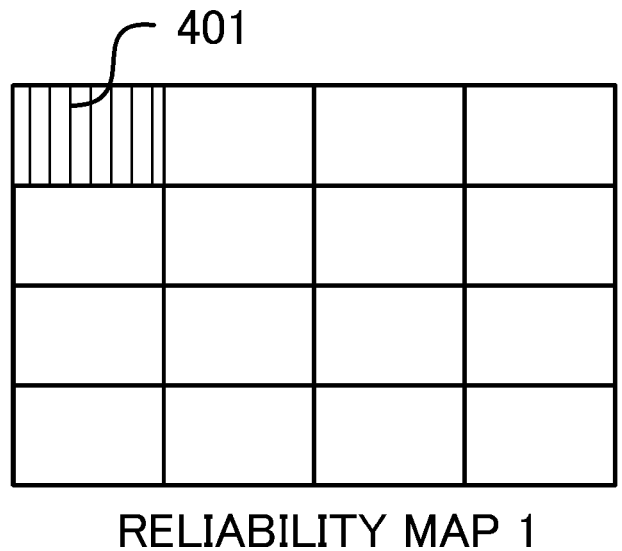
FIG. 4A, FIG. 4B, FIG. 4C and FIG. 4D are diagrams depicting a reliability map generation processing.
Figure 4B:
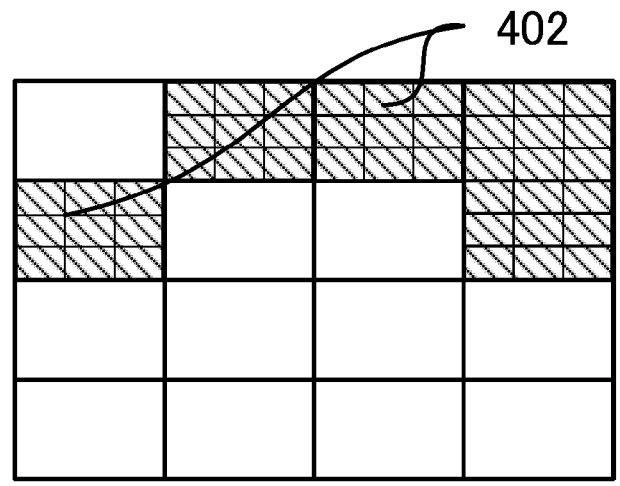

An example of determining reliability for each area by applying a plurality of evaluation standards and generating a reliability map of the focused image in FIG. 3A will be described with reference to FIG. 4. For this description, it is assumed that the reliability map is segmented into 4×4, that is 16 areas. FIG. 4A is a reliability map generated based on the evaluation standard "low reliability is assigned to an area whose average brightness is higher than a threshold". FIG. 4B is a reliability map generated based on the evaluation standard "low reliability is assigned to an area whose brightness change width is lower than a threshold". A reliability value to be assigned may be expressed by an arbitrary numeric value, or a numeric value from 0 to 1 generated by normalizing the maximum value to the minimum value, for example. There is no special rule for this expression method. According to this embodiment, two reliability maps, the one shown in FIG. 4A and the other shown in FIG. 4B, are generated in step S211. In this embodiment, two reliability maps are generated based on the different evaluation standards, but any number of reliability maps may be generated, or reliability maps which are integrated into one may be outputted.

Figure 5A:
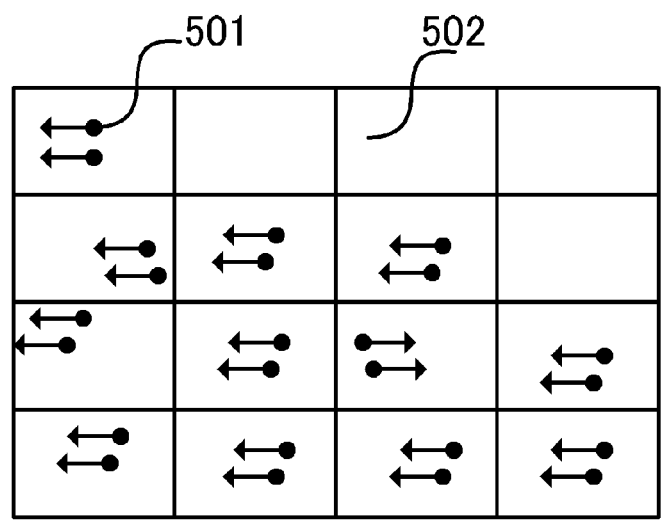
FIG. 5A and FIG. 5B are diagrams depicting an overview of alignment processing.
Figure 5B:
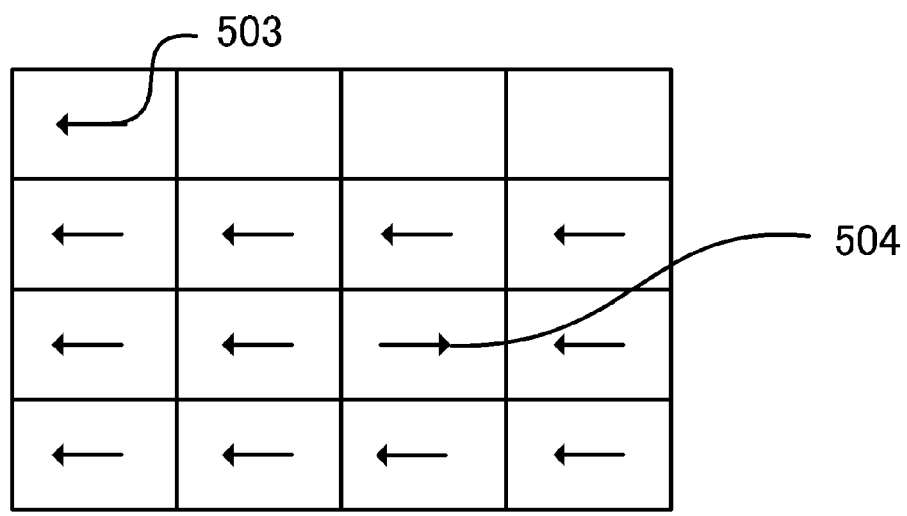

Then in step S212, the alignment unit 201 detects the misalignment of the focused image and the defocused image, and the reliability map calculation unit 203 further generates a reliability map based on this detection result. The alignment is processing to minimize the influence of the change of magnification of the image when the photography conditions are changed, and the influence of camera movement. Based on the misalignment amount (moved distance) and/or misalignment direction (moved direction) detected during alignment, that is, based on the misalignment of the focused image and the defocused image, a reliability map, which is different from then reliability map generated in step S212, is generated. The reason why the reliability map is generated based on misalignment is that if corresponding areas of the focused image and the defocused image are obviously misaligned, the distance of this area estimated by the DFD method is likely to be incorrect. The alignment processing is performed by segmenting the image into a plurality of areas, and calculating a motion vector for each area. FIGS. 5A and 5B are diagrams depicting an overview of the alignment processing.

FIG. 5A is a result of block matching which was performed by segmenting an image into micro-areas (not illustrated). Each arrow indicated by the reference numeral 501 is a motion vector calculated for each micro-area. These motion vectors are integrated for each of the 4×4 large areas indicated by the reference numeral 502, and a representative motion vector 503, which is a motion vector in each large area, is calculated. FIG. 5B shows a representative motion vector for each area. The representative motion vector can be calculated using a mean value, a median value or the like. This calculation method is not limited to a specific method.

Figure 4C:
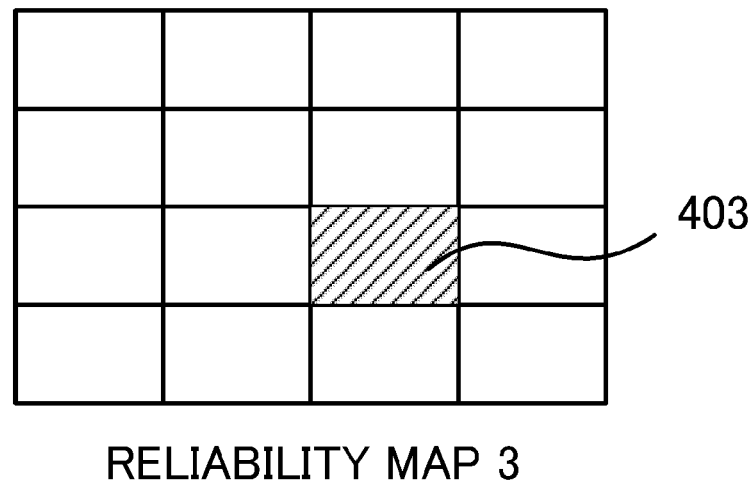

Now a case when only the head of the main object 301 in FIG. 3, which moved to the right between the focused image and the defocused image, is considered. In this case, only in an area where the head belongs, the direction of the representative motion vector is different from the peripheral areas. Therefore it is determined that the area where the head belongs is an area where correspondence of the focused image and the defocused image is insufficient, and is an area where the reliability of the estimated distance is low. In step S212, a lower reliability is assigned to an area as the direction and magnitude of the representative motion vector in this area differ more from the peripheral representative motion vectors. For example, a mean value of the representative motion vectors in a plurality of areas around a target area is calculated, and a lower reliability is assigned as the difference of the representative motion vector value in this target area from the mean value is increased. FIG. 4C is a reliability map generated by alignment processing. As mentioned above, low reliability is assigned to a portion of an area 403, whose representative motion vector is different from the peripheral areas. In this embodiment, the representative motion vector is calculated and then the reliability is calculated, but it need not always be calculated this way, since the reliability may be directly calculated from the motion vector of the micro-area. The motion of the object may be detected by acquiring the difference between the focused image and the defocused image, and the reliability of an area whose motion is greater than the peripheral areas may be decreased.

Then in step S213, the depth map estimation unit 202 creates a depth map.

Figure 7:
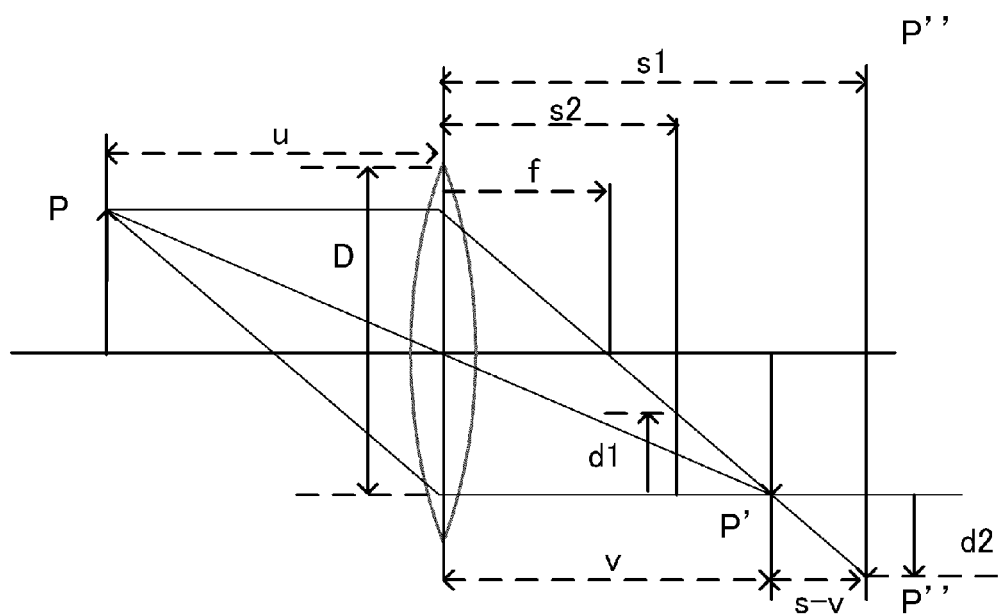
FIG. 7 is a diagram depicting a principle of estimating a distance by the DFD method.

In this embodiment, the DFD method is used to estimate the depth map. Now the principle of the DFD method will be described in brief with reference to FIG. 7. In FIG. 7, the distance u to the target object P can be calculated by the focal length f of the lens using Formula 1, if the position v, where the target object P is focused, is known.

[Math. 1]

$$\frac{1}{f} = \frac{1}{u} + \frac{1}{v} \qquad (1)$$

According to the DFD method, the focusing position v is determined by the degree of blurring of the image projected onto the image detector plane based on the difference of the image detector plane position and the focusing position of the target object P, and the distance to the target object P is calculated by substituting this value v in Formula 1. If the image detector plane is at $s_1$, a point on the object surface whose distance is u is diffused in a circle called the "circle of confusion" on the image detector plane, where an image $i_1$ given by Formula 2 is formed.

[Math. 2]

$$i_1 = h_1 * i_0 \qquad (2)$$

Here * denotes a convolution operation, and $i_0$ denotes an image at a focused position. $h_1$ denotes a point spread function (PSF), and depends on a diameter $d_1$ of a circle of confusion, which is in proportion to the distance $v-s_i$ between the image detector plane and the focusing position. Now a PSF model, whose parameter is the diameter of the circle of confusion, is assumed, and the diameter $d_1$ of the circle of confusion is estimated from the image $i_1$. However as Formula 2 shows, the observed image $i_1$ depends on the image $i_0$ of the target object, and hence the diameter $d_1$ of the circle of confusion cannot be determined in this state. Therefore an observed image $i_2$ at a different image detector plane position $s_2$ is captured, and the ratio of the observed image $i_1$ and the observed image $i_2$ in the frequency area of the image is determined, whereby the relationship between the observed image and PSF can be derived using the following Formula 3.

[Math. 3]

$$\frac{I_1}{I_2} = H_1 \times \frac{I_0}{H_2 \times I_0} = \frac{H_1}{H_2} \qquad (3)$$

Here $I_1$, $I_2$, $I_0$, $H_1$ and $H_2$ are Fourier transform results of the observed images $i_1$, $i_2$, the focused image $i_0$, and PSFs $h_1$ and $h_2$ respectively. The ratio of the Fourier-transformed PSFs is calculated in advance from the optical system parameters and a table thereof is created, and then the distance value can be calculated from an actually calculated value.

Figure 4D:
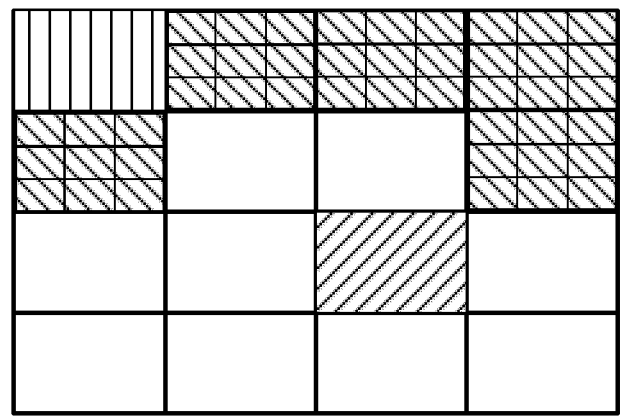

The description of the processing flow chart will continue. In step S214, a plurality of calculated reliability maps are integrated, and an integrated reliability map is created. A processing for creating an integrated reliability map will now be described with reference to FIGS. 4A, 4B, 4C, and 4D 4B. FIG. 4A and FIG. 4B are reliability maps determined based on the focused image in step S211. FIG. 4C is a reliability map calculated by the alignment processing performed in step S212. These reliability maps are integrated as shown in FIG. 4D. In concrete terms, each reliability is normalized to a predetermined value range and is multiplied in each area. The integration method is not limited to a specific method. For example, each reliability may be weighted depending on the photographing mode (e.g. whether an object moves frequently or an object is still). In this embodiment, to simplify the description, a binarized integrated reliability map, where hatched portions indicate "low reliability" and other portions indicate "high reliability", is generated.

Figure 6A:
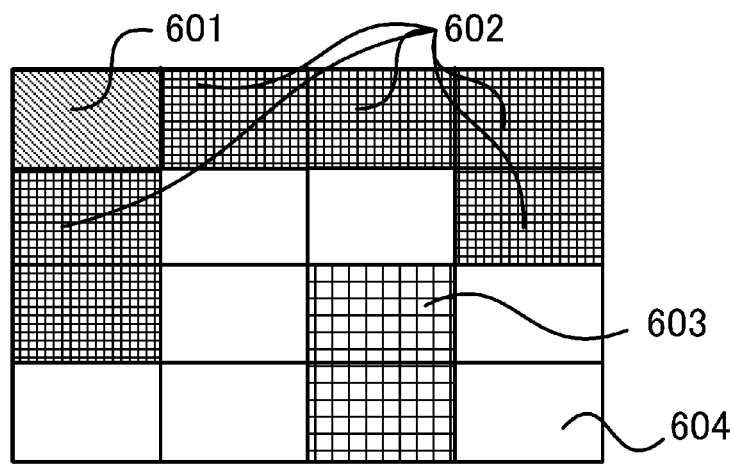
FIG. 6A, FIG. 6B, FIG. 6C and FIG. 6D are diagrams depicting an overview of depth map correction processing.

In step S215, the depth map correction unit 204 corrects the depth map created in step S213 using the integrated reliability map created in step S214. The overview of this processing will be described in brief with reference to FIGS. 6A-6D. First a plurality of areas, where the brightness and hue of the image are within predetermined ranges, are set for the focused image (FIG. 3A) acquired in step S201. In this example, as FIG. 6A shows, the image is segmented into 4×4 blocks, and four areas (area 601 to 604) hatched differently, are set. Each one of the four areas that are set is called a "correction area". To simplify description, it is assumed in this example that a size of a block segmented in this step and a size of the area used for the reliability map and the depth map are the same, but can be different from each other.

Then the depth map calculated in step S213 is corrected using the integrated reliability map generated in step S214.

Figure 6B:
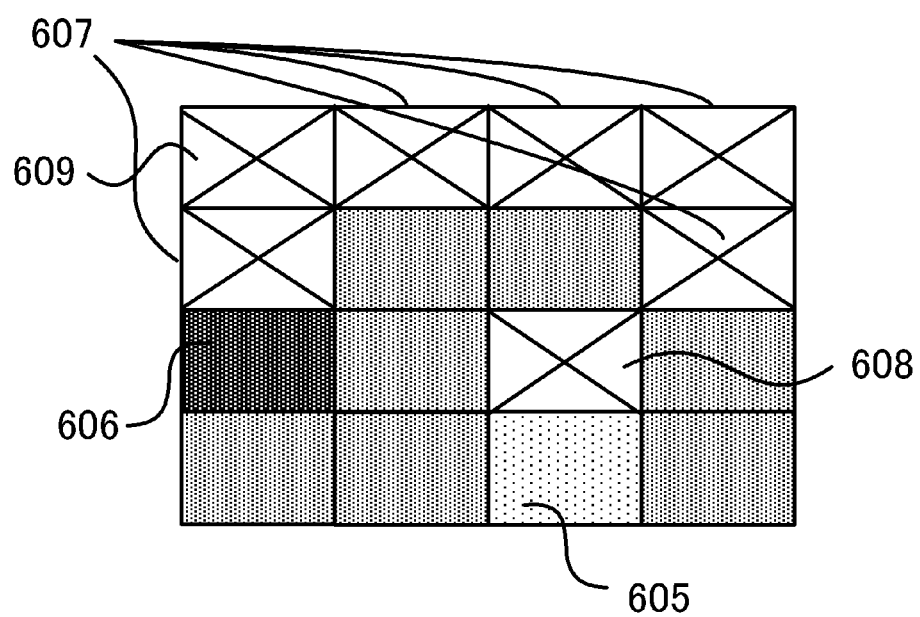
Figure 6C:
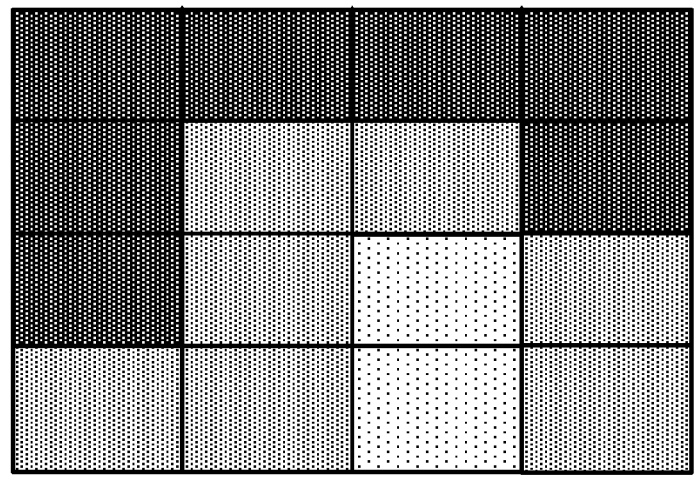

Here for an area whose reliability is low in the reliability map, the distance value that is set in this area is deleted, and a distance value that is set in a peripheral area whose reliability is high is substituted. FIG. 6B shows a state where distance values in areas whose reliability is low are deleted in the created depth map. An area crossed out with a x is an area whose reliability is low and the distance value is deleted. If there is an area having a distance value near an area not having a distance value, this distance value is substituted. In this case, priority is assigned to an area belonging to the same correction area.

Figure 6D:
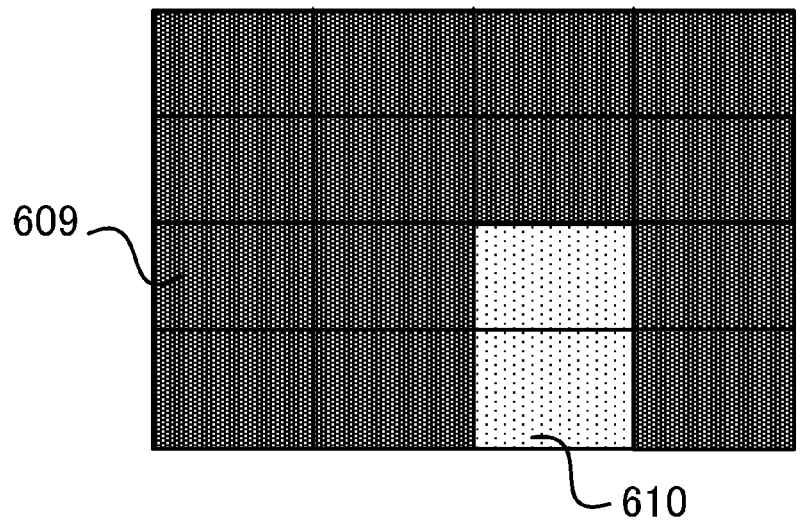

For example, the area 606 that belongs to the same correction area 602 to which the area 607 whose distance value is deleted belongs is an area for which the distance value has been calculated, and hence this distance value is assigned to the area 607. In the same manner, the distance value of the area 605 which belongs to the same correction area 603 to which the area 608 belongs is assigned to the area 608. For the area 609, there are no areas belonging to the same correction area, and therefore the distance value of the peripheral area (e.g. area 606, or area 607 after the distance value is assigned) is assigned to the area 609. By the above processing, the corrected depth map shown in FIG. 6C can be acquired. Then, a threshold processing operation is performed on the depth map to separate the foreground and the background, and a binary depth map shown in FIG. 6D is acquired. The depth map acquired like this is the corrected depth map according to the present invention. In this example, when a distance value is acquired, a priority is assigned to an area belonging to the same correction area, but a higher priority may be assigned sequentially to an area whose distance is closer, or distance values corresponding to a plurality of peripheral areas may be acquired and a mean value thereof may be used.

In step S216, the depth of field control unit 205 performs processing to change the depth of field using the depth map corrected in step S215. In concrete terms, a predetermined two-dimensional filter is applied to an area corresponding to the background area 609 in FIG. 6D of the focused image in FIG. 3A, and performs product-sum operation, whereby an image whose depth of field is corrected to be shallower can be acquired. For this filter, a Gaussian function may be used, or a filter simulating a predetermined lens may be used. The operation method is not limited to the product-sum operation, but may be a method using frequency space, such as FFT. No restriction is imposed on the operation method. An appropriate transition area may be created between the foreground area 610 and the background area 609 in FIG. 6D, so as to prevent sudden change.

Then processing moves to step S204, where the system control circuit 106 outputs the image, whose depth of field is shallow, created in step S203, to an image display device (not illustrated) via the image output unit 111.

As described above, the image pickup apparatus according to this embodiment calculates a depth map from a focused image and a defocused image, corrects the depth map considering reliability, and generates a blurring image using the corrected depth map. By this configuration, the error of the estimated distance can be decreased and image deterioration in blurring processing can be prevented.

The description of the embodiment is an example used for describing the present invention, and the present invention can be changed or combined without departing from the true spirit and scope of the invention. For example, in the description of the embodiment, the image processing apparatus according to the present invention is integrated into the image pickup apparatus, but the present invention can also be applied to other apparatuses only if two images—a focused image and a defocused image—can be acquired. For example, the present invention can be applied to an image reproducing device and an image display device, and can also be implemented as image processing software and as video editing software for example, for blurring still images and video clips. Further, in the description of the embodiment, the distance from the image pickup apparatus to the object is determined as the focusing distance. However, the focusing distance can be any distance only if the distance has correspondence with the distance from the image pickup apparatus to the object. For example, another distance on the object side (e.g., the distance between the object and the focusing position), a distance on the image plane side (e.g. defocusing amount), or an index value (score) acquired in the distance calculation based on the DFD method, may be used. For the DFD method, not only the method described in this embodiment, but also a method for determining a distance based on correlation of images, for example, may be used (e.g. see Japanese Patent Publication No. 3305314).

In the description of the embodiment, a distance value in an area whose reliability is low is deleted, and the distance value is interpolated using the distance value of a peripheral area, but the distance value may be simply corrected. An intensity parameter for controlling the depth of field may be changed depending on the reliability. For example, the blurring amount is adjusted by gain for an area whose reliability is low so that blurring is weakened, whereby visually perceived image deterioration can be relaxed. In the description of the embodiment, the reliability map is generated from the motion vector. However if misalignment between a plurality of images which blur differently is due to zooming and/or rotation, then the zooming and/or rotation between the plurality of images are/is calculated as misalignment based on the misalignment amount and misalignment direction, and the reliability information may be created based on this calculation result.

In the description of this embodiment, the processing for generating the reliability map by analyzing the images (step S211) and the processing for generating the reliability map based on the alignment result (step S212) are performed, but only the latter processing may be performed. The object of the present invention can be achieved even if the image analysis is not performed for a focused image.

The present invention can be embodied as an image processing method that includes at least a part of the above mentioned processing, or can be embodied as an image-processing program for a computer to execute this method. The above-mentioned processing and units may be freely combined in embodiments, as long as technical inconsistencies are not generated.

Aspects of the present invention can also be realized by a computer of a sys tem or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method for generating a depth map comprising the steps of:
   generating, in a first generating step, a depth map from an image signal acquired by a passive method; and
   generating, in a second generating step, from the image signal, an integrated reliability map representing the reliability of distance information of the depth map,
   wherein the second generating step comprises the steps of:
   generating a first reliability map by performing a first process on the image signal,
   generating a second reliability map by performing a second process, which is different from the first process, on the image signal, and
   integrating the first reliability map and the second reliability map to generate the integrated reliability map, and
   wherein the first reliability map, the second reliability map, and the integrated reliability map have the same resolution.

2. The method according to claim 1, wherein the first reliability map and the second reliability map are generated by using variable weights.

3. The method according to claim 2, wherein the weights are changed based on a photographing mode used when the image signal is acquired.

4. The method according to claim 1, further comprising acquiring the distance information based on a correlation between a first image signal and a second image signal, wherein the image signal includes the first image signal and the second image signal.

5. The method according to claim 1, wherein the distance information is information related to a distance to a subject.

6. The method according to claim 1, wherein the image signal includes a first image signal and a second image signal, and the integrated reliability map is generated by analyzing the first image signal or the second image signal, and the second reliability map is generated based on a misalignment of the first image signal and the second image signal.

7. The method according to claim 1, wherein the first reliability map is generated using first evaluation criteria, and the second reliability map is generated using second evaluation criteria, which is different from the first evaluation criteria.

8. An apparatus that generates a depth map comprising:
   circuitry, the circuitry configured to:
   generate a depth map from an image signal acquired by a passive method; and
   generate, from the image signal, an integrated reliability map representing the reliability of distance information of the depth map,
   wherein, when generating the integrated reliability map, the circuitry is further configured to:
   generate a first reliability map by performing a first process on the image signal,
   generate a second reliability map by performing a second process, which is different from the first process, on the image signal, and
   integrate the first reliability map and the second reliability map to generate the integrated reliability map, and
   wherein the first reliability map, the second reliability map, and the integrated reliability map have the same resolution.

9. The apparatus according to claim 8, wherein the circuitry integrates the first reliability map and the second reliability map by using variable weights.

10. The apparatus according to claim 9, wherein the circuitry changes the weights based on a photographing mode used when the image signal is acquired.

11. The apparatus according to claim 8, wherein the image signal includes a first image signal and a second image signal, and the circuitry acquires the distance information based on a correlation between the first image signal and the second image signal.

12. The apparatus according to claim 8, wherein the distance information is information related to a distance to a subject.

13. The apparatus according to claim 8, wherein the image signal includes a first image signal and a second image signal, and the circuitry generates the integrated reliability map by analyzing the first image signal or the second image signal, and generates the second reliability map based on a misalignment of the first image signal and the second image signal.

14. The apparatus according to claim 8, wherein the circuitry generates the first reliability map using first evaluation criteria, and generates the second reliability map using second evaluation criteria, which is different from the first evaluation criteria.

15. A non-transitory computer-readable storage medium recording a computer program for causing a computer to perform a method for generating a depth map, the method comprising the steps of:
   generating, in a first generating step, a depth map from an image signal acquired by a passive method; and
   generating, in a second generating step, from the image signal, an integrated reliability map representing the reliability of distance information of the depth map,
   wherein the second generating step comprises the steps of:
   generating a first reliability map by performing a first process on the image signal,
   generating a second reliability map by performing a second process, which is different from the first process, on the image signal, and
   integrating the first reliability map and the second reliability map to generate the integrated reliability map, and
   wherein the first reliability map, the second reliability map, and the integrated reliability map have the same resolution.

16. An apparatus that generates a depth map comprising:
   depth map generating means for generating a depth map from an image signal acquired by a passive method; and
   reliability map generating means for generating, from the image signal, an integrated reliability map representing the reliability of distance information of the depth map,
   wherein the reliability map generating means:
   generates a first reliability map by performing a first process on the image signal,
   generates a second reliability map by performing a second process, which is different from the first process, on the image signal, and
   integrates the first reliability map and the second reliability map to generate the integrated reliability map.

* * * * *